No. 749,962. PATENTED JAN. 19, 1904.
C. E. & C. T. FOOTE.
MIXING MACHINE.
APPLICATION FILED JUNE 18, 1902.
NO MODEL. 2 SHEETS—SHEET 1.

WITNESSES:
Geo. W. Naylor

INVENTORS
Charles E. Foote
Chester T. Foote
BY
ATTORNEYS

No. 749,962. PATENTED JAN. 19, 1904.
C. E. & C. T. FOOTE.
MIXING MACHINE.
APPLICATION FILED JUNE 18, 1902.
NO MODEL. 2 SHEETS—SHEET 2.

WITNESSES:
Geo. W. Naylor
Rev. G. Hosler

INVENTORS
Charles E. Foote
Chester T. Foote
BY
ATTORNEYS

No. 749,962.

Patented January 19, 1904.

UNITED STATES PATENT OFFICE.

CHARLES EDWIN FOOTE AND CHESTER THOMAS FOOTE, OF NUNDA, NEW YORK.

MIXING-MACHINE.

SPECIFICATION forming part of Letters Patent No. 749,962, dated January 19, 1904.

Application filed June 18, 1902. Serial No. 112,252. (No model.)

*To all whom it may concern:*

Be it known that we, CHARLES EDWIN FOOTE and CHESTER THOMAS FOOTE, citizens of the United States, and residents of Nunda, in the county of Livingston and State of New York, have invented a new and Improved Mixing-Machine, of which the following is a full, clear, and exact description.

The object of the invention is to provide a new and improved mixing-machine, and particularly designed for producing concrete, mortar, and the like and arranged to insure a thorough mixing of the ingredients to produce a mass of uniform composition throughout and to allow of running the machine either as a continuous-discharge machine or for forming and discharging the mass produced in batches.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1:
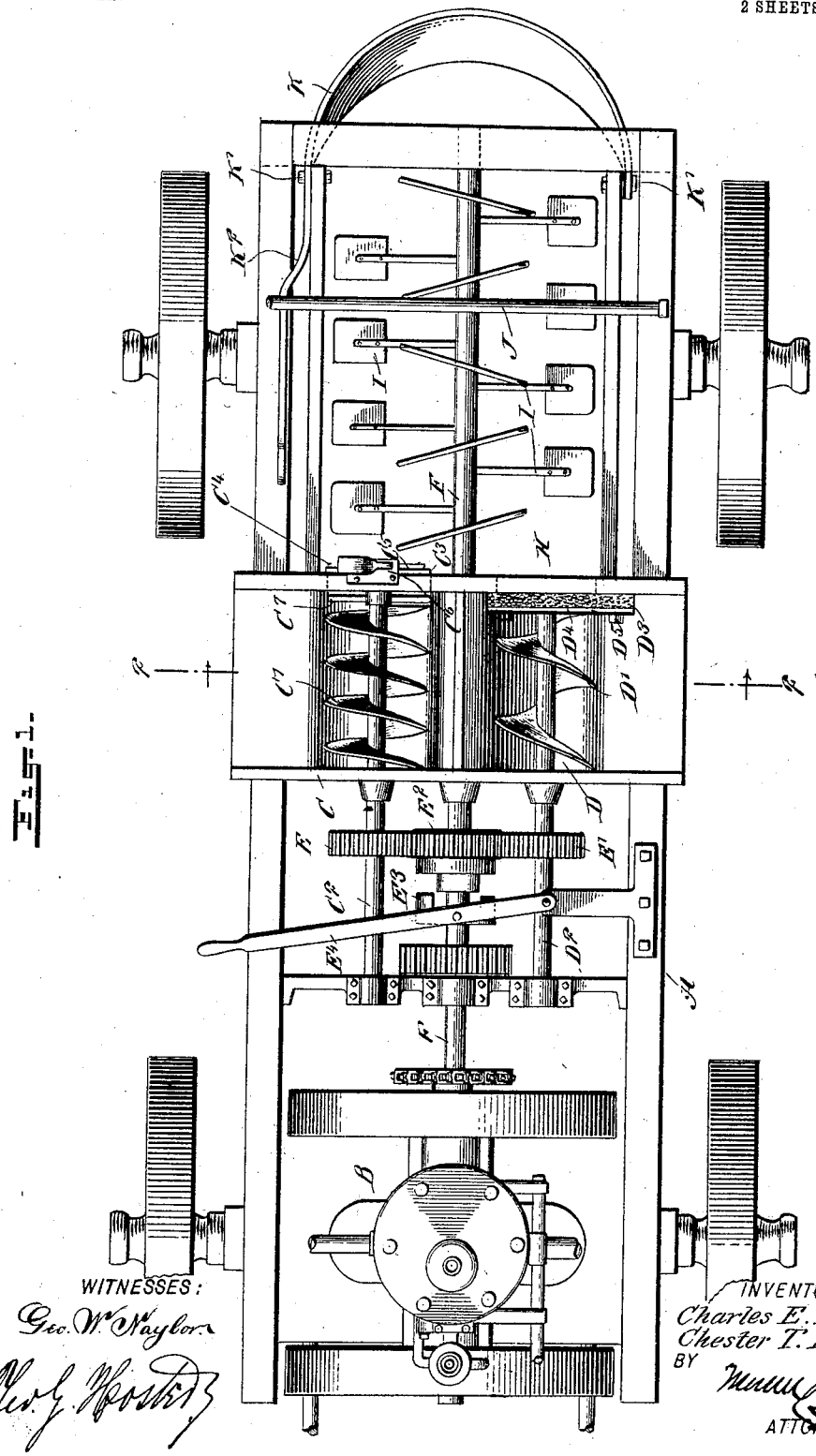
Figure 2:
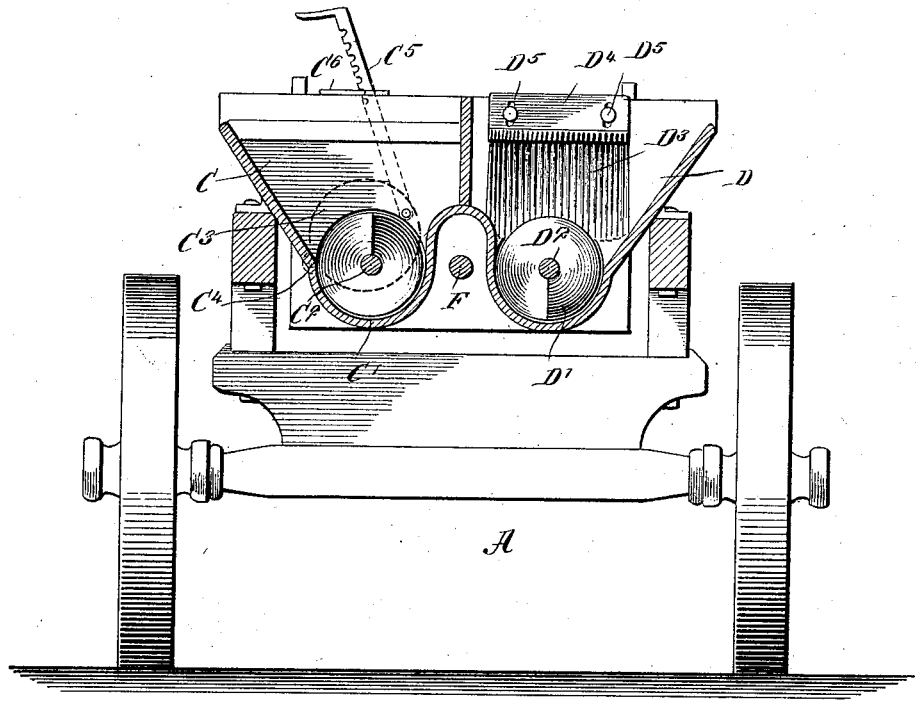

Figure 1 is a plan view of the improvement. Fig. 2 is a transverse section of the same on the line 2 2 of Fig. 1, and Fig. 3 is a side elevation of part of the mixing-trough and end gate.

The improved mixing-machine is preferably mounted on a wheeled vehicle A, adapted to be moved about from place to place and arranged to support at its front end a motor B of any approved construction for driving the feeding and mixing devices, as will hereinafter be more fully described. On the frame of the vehicle A are secured the feed-troughs C and D, arranged one alongside the other and containing feed-screws C' and D', respectively, secured on shafts $C^2$ $D^2$, connected by gear-wheels E and E' with a clutch gear-wheel $E^2$, mounted to rotate loosely on a shaft F, extending longitudinally and journaled in suitable bearings on the frame of the vehicle A. The shaft F is driven by suitable means from the motor B. The clutch gear-wheel $E^2$ is adapted to be engaged by a clutch $E^3$, mounted to slide on and to turn with the shaft F, and the said clutch $E^3$ is engaged by a shifting lever $E^4$ under the control of the operator to throw the clutch in and out of mesh with the clutch gear-wheel $E^2$. Thus when the main shaft F is rotated and the clutch $E^3$ is in mesh with the clutch gear-wheel $E^2$ then both feed-screws C' and D' are simultaneously rotated in the feed-troughs C and D to feed the different ingredients in the proper quantities through the discharge ends of the troughs into a mixing-trough H, mounted on the rear end of the vehicle-frame. In this mixing-trough H extend the mixing-wings I, secured on the rear portion of the shaft F, so that when the latter is rotated then the said wings I mix the separate ingredients fed from the troughs C and D into the trough H and at the same time the mixture is moved toward the rear end of the trough to be finally discharged therefrom either continuously or in batches.

Figure 3:
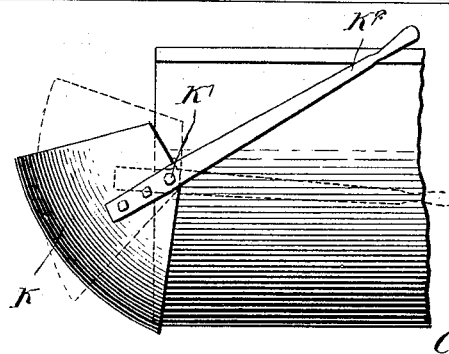

For discharging the mass continuously the rear end of the trough H is left open; but for forming the material in batches an end gate K is used, and this end gate is made in the shape of a dished segment pivoted at its sides at K' on the sides of the trough H, and on the gate is arranged a handle $K^2$ under the control of the operator to enable the latter to close the gate, as shown in Fig. 3, or to swing the same into an open position, as indicated in full lines in Fig. 1 and in dotted lines in Fig. 3.

A pipe J extends across the top of the mixing-trough H between the ends thereof, and this pipe J is connected with a suitable water-supply, so that jets of water are discharged into the mass contained in the mixing-trough H, it being understood that the ingredients are first mixed dry after leaving the feed-troughs C and D, and finally the ingredients are mixed wet previous to being discharged for accumulating in batches in the end gate K.

On the discharge end of the trough C is arranged a gate $C^3$, fulcrumed at $C^4$ on the end of the trough and engaged at its free end by a handle $C^5$ under the control of the operator for swinging the gate C³ into a desired open or a closed position. The upper end of the handle C⁵ is notched to hook onto a plate C⁶ for holding the gate C³ in a desired position. Thus by the operator adjusting the handle on the plate C⁶ more or less material is discharged from the trough C by the feed-screw C'.

On the shaft C² are secured radial stirring-arms C⁷, located close to the discharge-opening in the end of the trough C to prevent the material from packing against the discharge end and allowing an even discharge at all times. The discharge-opening of the trough D is unobstructed, and in order to prevent any clogging of the material in this trough D a brush D³ is provided, preferably made of steel wire and extending into the trough at the inside of the end thereof next to the end of the feed-screw D', as plainly illustrated in Figs. 1 and 2. The steel wires of the brush are secured to a back D⁴, held vertically adjustable by bolts D⁵ on the end of the trough. (See Fig. 2.) As will be evident, this wire brush when mounted in its operative position in the machine performs the very important function of impeding the flow of material from the feed-trough to the mixing-trough, only permitting the passage of the material forced through by the feed-worm. The brush, which is mounted above the worm, is concaved at its bottom portion immediately contiguous thereto, and bits of stone or large gravel which could not pass through an opening formed in non-yieldable material for the passage of the worm are readily allowed to escape by the brush yielding sufficiently to permit their passage without clogging or breaking the worm. The above-described arrangement of the brush relative to the worm insures a very even feed of the material from the feed-trough to the mixing-trough.

The operation is as follows: When using the machine for forming concrete, for instance, the cement is placed in the trough C and the sand and gravel are placed in the trough D. The clutch E³ is now thrown into engagement with the clutch-wheel E², and when the motor B is now started up then the feed-screws C' and D' are rotated, and the cement is uniformly fed past the gate C³ into the trough H, and the sand and gravel are likewise fed into the said trough. The wings I now mix the cement and the sand and gravel dry until the mixture is moistened by the water issuing from the pipe J. As the mixture is fed rearwardly it becomes thoroughly moistened to form concrete of a uniform composition throughout, and this concrete is either discharged continuously from the end of the trough by the wings I at the time the gate K is opened or the said concrete accumulates in a desired quantity in the end gate K when the latter is in a closed position. When the desired amount of concrete for forming a batch has accumulated in the gate K, the latter is swung open by the operator manipulating the handle K², so that the batch of concrete slides out of the end gate K into a wheelbarrow or other receptacle for receiving the concrete.

When it is desired to stop the feeding of the cement, sand, and gravel and to keep on mixing the ingredients continually in the trough H, then it is only necessary for the operator to swing the shifting lever E⁴ into the position shown in Fig. 1, so that the clutch E³ moves out of engagement with the clutch-wheel E² to stop the shafts C² D² from rotating, and consequently stop the feed-screws C' and D'.

Having thus described our invention, we claim as new and desire to secure by Letters Patent—

1. A mixing-machine comprising a feed-trough having feeding devices therein, a mixing-trough receiving the discharge from said feed-trough and having mixing devices therein, a vertically-swinging gate located at the discharge end of the mixing-trough, and constructed to contain or hold a definite quantity of material, means for dumping said gate of its contents when the same becomes filled, and a partition located at the discharge-opening of said feed-trough, formed of material yieldable in a direction substantially parallel with the direction of feed of the feeding devices in this trough, and normally closing upon these devices at such opening.

2. A mixing-machine, comprising a feed-trough having feed devices therein, and a partition located at the discharge-opening of said trough, formed of material yieldable in a direction substantially parallel with the direction of feed of the feed devices and normally closing upon these devices at such opening.

3. A mixing-machine, comprising duplicate feed-troughs, each having feed devices therein and provided with a discharge-opening, a swinging gate at the discharge-opening of one trough having an operating-handle for opening and closing the same, and a vertically-adjustable closure located at the discharge-opening of the other trough, said closure being formed of a series of brush-like wires, the lower ends of which are constructed to conform to and fit the feed devices at said discharge-opening at which the closure is situated.

4. A mixing-machine, comprising a feed-trough having a discharge-opening, and provided with feed devices located in line with the opening, and an adjustable closure or partition located at said opening and consisting of a series of closely-arranged vertically-disposed wires conforming at the lower ends thereof with the shape of the sides of the opening, and attached at their upper ends to a back or stock therefor.

5. A mixing-machine having a feed-trough, a feed-screw therein, and a brush adjustably mounted above said feed-screw, said brush being concaved at its lower portion and consisting of vertically-disposed straight wires attached to a backing extending transversely of said trough, substantially as set forth.

6. A mixing-machine comprising separate feed-troughs, a mixing-trough into which discharge the open ends of the feed-troughs, a feed-worm of different pitch working in each of said feed-troughs and adapted to force the materials to be mixed into the mixing-trough in relatively different quantities, and a single shaft provided with beater or mixing blades radially inclined relative to the shaft, for thoroughly commingling the materials in the mixing-trough, the shaft of one of said worms being provided with stirring-arms located close to the discharge-opening inside the corresponding feed-trough, substantially as set forth.

In testimony whereof we have signed our names to this specification in the presence of two subscribing witnesses.

CHARLES EDWIN FOOTE.
CHESTER THOMAS FOOTE.

Witnesses:
FRANK U. DAVIDSON,
JOHN E. MILLS.